(12) United States Patent (10) Patent No.: US 12,654,097 B2
Huang (45) Date of Patent: Jun. 16, 2026

(54) GAME GROUP PROCESSING METHOD AND APPARATUS AND ELECTRONIC TERMINAL

(71) Applicant: NETEASE (HANGZHOU) NETWORK CO., LTD., Hangzhou (CN)

(72) Inventor: Huaying Huang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 426 days.

(21) Appl. No.: 18/555,881

(22) PCT Filed: Sep. 7, 2021

(86) PCT No.: PCT/CN2021/116976
§ 371 (c)(1),
(2) Date: Oct. 18, 2023

(87) PCT Pub. No.: WO2022/222347
PCT Pub. Date: Oct. 27, 2022

(65) Prior Publication Data
US 2024/0198223 A1 Jun. 20, 2024

(30) Foreign Application Priority Data

Apr. 20, 2021 (CN) .......................... 202110428007.3

(51) Int. Cl.
*A63F 13/52* (2014.01)
*A63F 13/2145* (2014.01)
(52) U.S. Cl.
CPC .......... *A63F 13/52* (2014.09); *A63F 13/2145* (2014.09)
(58) Field of Classification Search
CPC .... A63F 13/52; A63F 13/2145; A63F 13/795; A63F 13/822; A63F 13/50
See application file for complete search history.

(56) References Cited

U.S. PATENT DOCUMENTS

| | | | |
|---|---|---|---|
| 12,303,785 B2 * | 5/2025 | Takemura | ............... A63F 13/79 |
| 12,318,692 B2 * | 6/2025 | Wen | ...................... A63F 13/426 |

(Continued)

FOREIGN PATENT DOCUMENTS

| | | |
|---|---|---|
| CN | 104125851 A | 10/2014 |
| CN | 108187343 A | 6/2018 |

(Continued)

OTHER PUBLICATIONS

Notice of Allowance dated Dec. 15, 2023 of Chinese Application No. 202110428007.3.

(Continued)

*Primary Examiner* — Peter J Iannuzzi
(74) *Attorney, Agent, or Firm* — Qinghong Xu

(57) ABSTRACT

A method and apparatus for processing a group in a game, and an electronic terminal are provided. The method includes: displaying at least one group in a graphical user interface; displaying, in response to a first selection operation for a first group, an editing interface that includes at least one first virtual character belonging to the first group; moving, in response to a first sub-selection operation, a first target virtual character selected by the first sub-selection operation from the at least one first virtual character into a target group; displaying, in response to a second selection operation for a second group, an adjustment interface that includes at least one second virtual character belonging to the second group; and moving, in response to a second sub-selection operation, a second target virtual character selected by the second sub-selection operation from the at least one second virtual character into the first group.

20 Claims, 8 Drawing Sheets

(56) References Cited

U.S. PATENT DOCUMENTS

| | | | |
|---|---|---|---|
| 2015/0238862 A1 | 8/2015 | Suzuki | |
| 2021/0031113 A1* | 2/2021 | Ohtani | A63F 13/822 |
| 2022/0047941 A1* | 2/2022 | Chen | A63F 13/837 |

FOREIGN PATENT DOCUMENTS

| | | | |
|---|---|---|---|
| CN | 110124321 A | 8/2019 | |
| CN | 110420459 A | 11/2019 | |
| CN | 111111215 A | 5/2020 | |
| CN | 111773735 A | 10/2020 | |
| CN | 112494955 A | 3/2021 | |
| CN | 113101671 A | 7/2021 | |
| JP | 2015163262 A | 9/2015 | |
| JP | 2017064081 A | 4/2017 | |
| JP | 2019098145 A | 6/2019 | |
| JP | 2019134946 A | 8/2019 | |
| JP | 2019147003 A | 9/2019 | |
| JP | 6845454 B1 | 3/2021 | |

OTHER PUBLICATIONS

1st Office Action dated Nov. 7, 2023 of Japanese Application No. 2022-567387.
International Search Report dated Jan. 19, 2022 of International Application No. PCT/CN2021/116976.

* cited by examiner

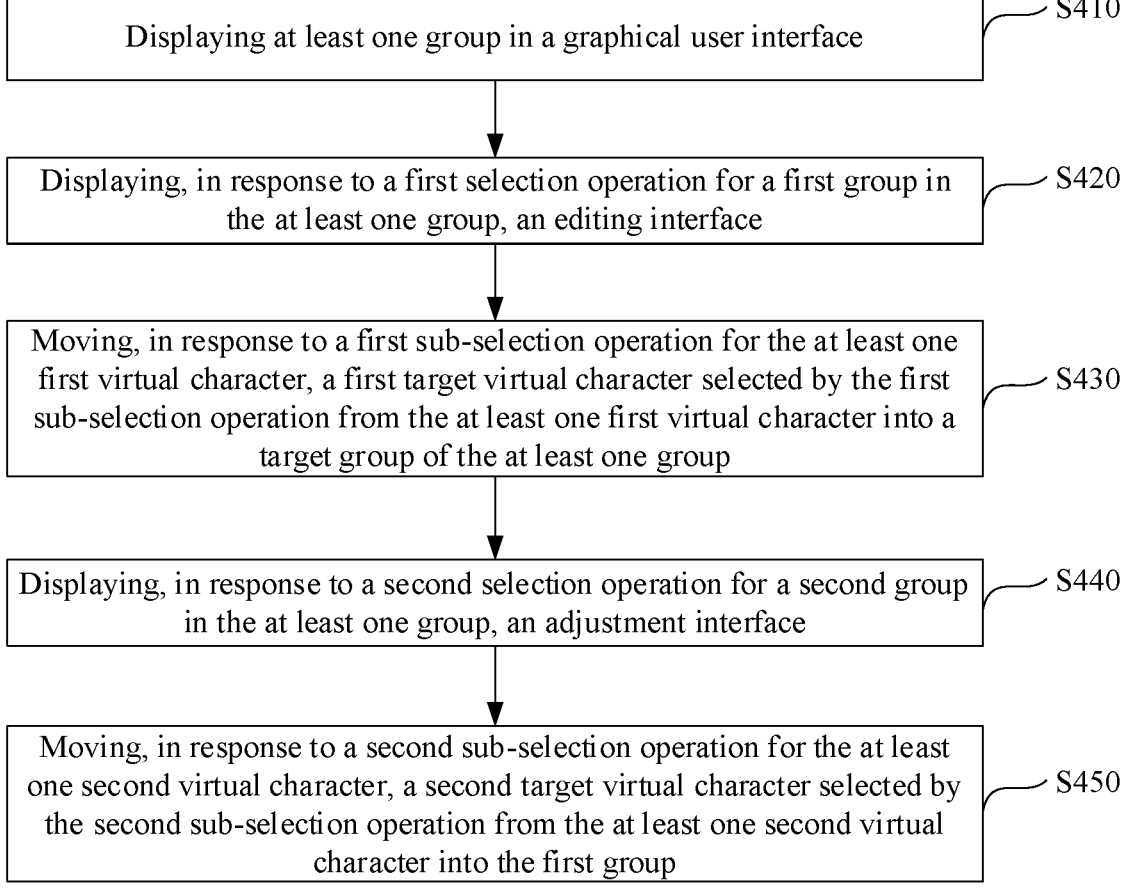

Displaying at least one group in a graphical user interface — S410

Displaying, in response to a first selection operation for a first group in the at least one group, an editing interface — S420

Moving, in response to a first sub-selection operation for the at least one first virtual character, a first target virtual character selected by the first sub-selection operation from the at least one first virtual character into a target group of the at least one group — S430

Displaying, in response to a second selection operation for a second group in the at least one group, an adjustment interface — S440

Moving, in response to a second sub-selection operation for the at least one second virtual character, a second target virtual character selected by the second sub-selection operation from the at least one second virtual character into the first group — S450

FIG. 4

GAME GROUP PROCESSING METHOD AND APPARATUS AND ELECTRONIC TERMINAL

CROSS-REFERENCE TO RELATED APPLICATIONS

The present disclosure is a U.S. national phase application of International Application PCT/CN2021/116976, filed on Sep. 7, 2021, which is based on and claims the priority of the Chinese Patent Application No. 202110428007.3, filed on Apr. 20, 2021, and entitled "GAME GROUP EDITING METHOD AND APPARATUS AND ELECTRONIC TERMINAL", the entire contents of both of which are hereby incorporated by reference for all purposes.

TECHNICAL FIELD

The present disclosure relates to the field of gaming technology, and in particular, to a method and apparatus for processing a group in a game, and an electronic terminal.

BACKGROUND

Currently, in many games, multiple virtual characters of a camp are often divided into multiple groups. For example, in a Massive Multiplayer Online Role-Playing Games (MMORPG), multiple teams (or groups) of the same camp are often required to participate in the game battles, and each team generally includes at least one member (virtual character or virtual role) to participate in the battles. The virtual characters of the same camp or on the same side may play against virtual characters from the other camps; or the virtual characters of the same camp or on the same side may collaborate together to achieve the same goal.

It should be noted that the above information disclosed in the "BACKGROUND" section is intended only to enhance the understanding of the context of this disclosure and may therefore include information that does not constitute prior art known to those of ordinary skill in the art.

SUMMARY

According to aspects of the present disclosure, a method and apparatus for processing a group in a game, and an electronic terminal are provided, in order to alleviate a technical problem of a low degree of ease of operation for editing virtual characters of multiple groups.

In a first aspect, a method for processing a group in a game is provided by embodiments of the present disclosure, in which a graphical user interface is provided via a terminal device. The method further includes: displaying at least one group in the graphical user interface: displaying, in response to a first selection operation for a first group in the at least one group, an editing interface, wherein the editing interface includes at least one first virtual character belonging to the first group: moving, in response to a first sub-selection operation for the at least one first virtual character, a first target virtual character selected by the first sub-selection operation from the at least one first virtual character into a target group of the at least one group: displaying, in response to a second selection operation for a second group in the at least one group, an adjustment interface, wherein the adjustment interface includes at least one second virtual character belonging to the second group: and moving, in response to a second sub-selection operation for the at least one second virtual character, a second target virtual character selected by the second sub-selection operation from the at least one second virtual character into the first group.

In a second aspect, an electronic terminal is also disclosed by embodiments of the present disclosure, including a memory and a processor. The memory has a computer program stored therein that is runnable on the processor. The processor, when executing the computer program, implements the following acts: providing a graphical user interface and displaying at least one group in the graphical user interface: displaying, in response to a first selection operation for a first group in the at least one group, an editing interface, wherein the editing interface includes at least one first virtual character belonging to the first group; moving, in response to a first sub-selection operation for the at least one first virtual character, a first target virtual character selected by the first sub-selection operation from the at least one first virtual character into a target group of the at least one group: displaying, in response to a second selection operation for a second group in the at least one group, an adjustment interface, wherein the adjustment interface includes at least one second virtual character belonging to the second group: and moving, in response to a second sub-selection operation for the at least one second virtual character, a second target virtual character selected by the second sub-selection operation from the at least one second virtual character into the first group.

In a third aspect, a non-transitory computer-readable storage medium is also disclosed by embodiments of the present disclosure. The computer-readable storage medium has computer-runnable instructions stored thereon, and the computer-runnable instructions, when invoked and run by a processor, cause the processor to provide a graphical user interface and display at least one group in the graphical user interface: display, in response to a first selection operation for a first group in the at least one group, an editing interface, wherein the editing interface includes at least one first virtual character belonging to the first group: move, in response to a first sub-selection operation for the at least one first virtual character, a first target virtual character selected by the first sub-selection operation from the at least one first virtual character into a target group of the at least one group: display, in response to a second selection operation for a second group in the at least one group, an adjustment interface, wherein the adjustment interface includes at least one second virtual character belonging to the second group: and move, in response to a second sub-selection operation for the at least one second virtual character, a second target virtual character selected by the second sub-selection operation from the at least one second virtual character into the first group.

It should be understood that both the foregoing general description and the following detailed description are exemplary and explanatory only and do not limit the present disclosure.

BRIEF DESCRIPTION OF THE DRAWINGS

FIG. 4 illustrates a flowchart of a method for processing a group in a game provided by one or more embodiments of the present disclosure.

DETAILED DESCRIPTION

The present disclosure will be described clearly and completely in the following in conjunction with the accompanying drawings. It is apparent that the described embodiments are part of the embodiments of the present disclosure, but not all of the embodiments. Based on the embodiments in the present disclosure, all other embodiments obtained by a person of ordinary skill in the art without making creative labor are within the scope of protection of the present disclosure.

The terms "comprising/including" and "having" and any variations thereof referred to in embodiments of the present disclosure are intended to cover non-exclusive inclusion. For example, a process, method, system, product, or apparatus that includes a series of steps or units is not limited to the listed steps or units, but additionally includes other steps or units that are not listed, or additionally includes other steps or units that are inherent to the process, method, product, or apparatus.

At present, when conducting a team fight (or team battle), the team leader or captain usually needs to adjust the member compositions of multiple teams to participate in the fight. If the fight includes multiple fights involving multiple teams, it will be difficult to adjust the member compositions of the teams to participate in the fights, as many MMORPG games can only support the adjustment of the members of a single team to participate in the fights, and cannot realize the adjustment across multiple teams. That is, only the members in one team can be adjusted in the same interface, which makes it less convenient to edit the members of multiple teams, or, the members of other teams can be added only through the new pop-up window; not directly adjusted in the original interface, and adjustment by adding new members is complicated in operation and brings a poor game experience.

In view of the above, a method and apparatus for processing a group in a game, and an electronic terminal are provided by embodiments of the present disclosure, by which a technical problem of a low degree of ease of operation for editing virtual characters of multiple groups can be alleviated.

The method for processing the group in the game, according to embodiments of the present disclosure, may be applied in a touch terminal including a touch screen and a processor. The touch screen is used to present a graphical user interface and to receive an operation for the graphical user interface.

In some embodiments, when editing the graphical user interface via the touch terminal, the graphical user interface can be used to edit the local content of the touch terminal or the content of a server on the other end.

Figure 1:
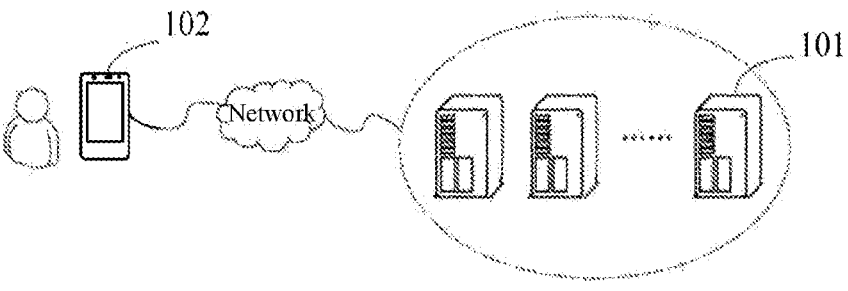
FIG. 1 illustrates a schematic diagram of an application scenario provided by one or more embodiments of the present disclosure.

For example, as shown in FIG. 1, FIG. 1 is a schematic diagram of an application scenario provided by one or more embodiments of the present disclosure. The application scenario may include a touch terminal (e.g., a cell phone 102) and a server 101. The touch terminal may communicate with the server 101 via a wired network or a wireless network. The touch terminal is used to run a virtual desktop, through which the touch terminal can interact with the server 101 to edit the content in the server 101.

Figure 2:
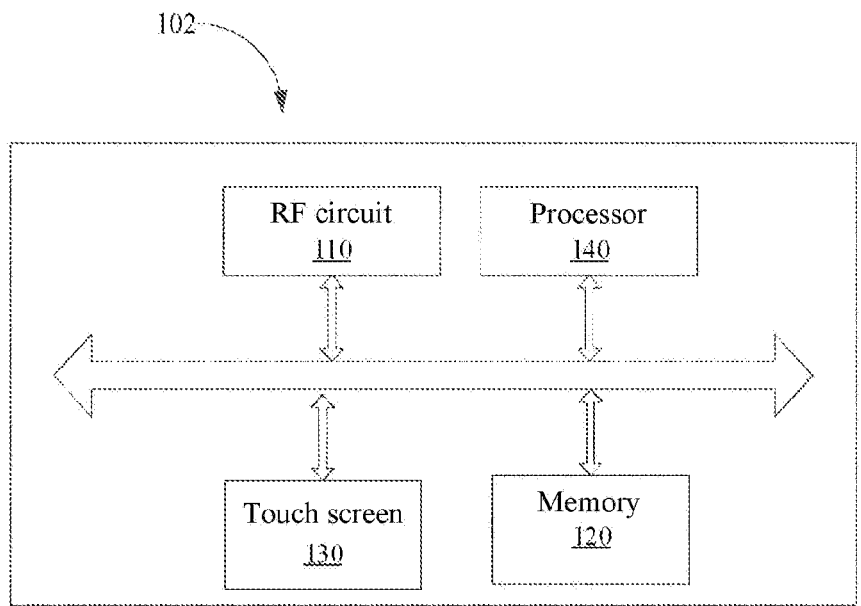
FIG. 2 illustrates a schematic diagram of a structure of a cell phone provided by one or more embodiments of the present disclosure.

In the embodiments, the touch terminal is illustrated as the cell phone 102. The cell phone 102 includes components such as a radio frequency (RF) circuit 110, a memory 120, a touch screen 130, a processor 140, and the like. A person skilled in the art will appreciate that the structure of the cell phone illustrated in FIG. 2 does not constitute a limitation of the cell phone, and may include more or fewer components than those illustrated, or a combination of certain components, or a separation of certain components, or a different arrangement of components. A person skilled in the art will appreciate that the touch screen 130 is a User Interface (UI), and that the cell phone 102 may include more or fewer UIs than illustrated.

The RF circuit 110 may communicate with networks and other devices via wireless communication. The wireless communication may utilize any communication standard or protocol, including but not limited to the Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 120 may be used to store software programs and modules, and the processor 140 executes various functional applications and data processing of the cell phone 102 by running the software programs and modules stored in the memory 120. The memory 120 may mainly include a storage program region and a storage data region, wherein the storage program region may store an operating system, an application program required for at least one function, etc., and the storage data region may store data created based on the use of the cell phone 102, etc. In addition, the memory 120 may include a high-speed random access memory, and may also include a non-volatile memory, such as at least one disk storage device, a flash memory device, or other volatile solid-state storage device.

Figure 3:
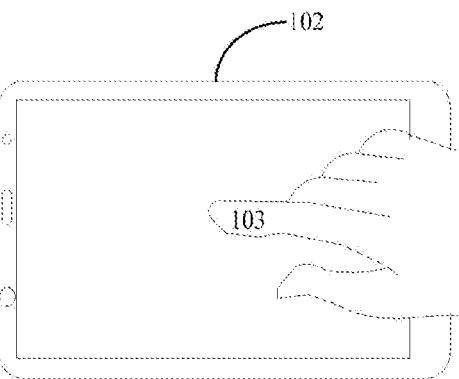
FIG. 3 illustrates a schematic diagram of a usage scenario of a touch terminal provided by one or more embodiments of the present disclosure.

The touch screen 130 may be used to display the graphical user interface and to receive the operations by users directed at the graphical user interface. The specific touch screen 130 may include a display panel and a touch panel. The display panel may be configured in the form of a Liquid Crystal Display (LCD), an Organic Light-Emitting Diode (OLED), or the like. The touch panel can collect the user's contact or non-contact operations on or near it and generate pre-set operating instructions, for example, as shown in FIG. 3, the user uses a finger 103, touch pen or any other suitable object or accessory to operate on or near the touch panel. In addition, the touch panel may include two parts, a touch detection device and a touch controller. The touch detection device detects the touch orientation and posture of the user, and detects signals caused by the touch operation, and transmits the signals to the touch controller. The touch controller receives the touch information from the touch detection device and converts it into information that the processor can process, and then sends it to the processor 140, and the touch controller can receive commands from the processor 140 and execute them. In addition, the touch panel can be implemented using a variety of types such as resistive, capacitive, infrared, and surface acoustic wave, or any technology developed in the future. Further, the touch panel may overlay the display panel, and a user may perform an operation on or near the touch panel overlaying the display panel based on the graphical user interface displayed by the display panel. The touch panel, after detects the operation on or near it, transmits the same to the processor 140 to determine the user's input, and the processor 140 subsequently provides a corresponding visual output on the display panel in response to the user's input. Besides, the touch panel and the display panel may be implemented as two separate components or may be integrated.

The processor 140 is a control center of the cell phone 102, utilizing various interfaces and circuits to connect various parts of the entire cell phone. It performs various functions and processes data of the cell phone 102 by running or executing software programs and/or modules stored in the memory 120 and by calling data stored in the memory 120, thereby monitoring the cell phone as a whole.

The cell phone 102 also includes a power supply (e.g., a battery) that powers the various components. The power supply may be logically coupled to the processor 140 via a power management system thereby achieving functions such as charging, discharging, and power consumption managements via the power management system.

Embodiments of the present disclosure are further described below in conjunction with the accompanying drawings.

FIG. 4 illustrates a flowchart of a method for processing a group in a game provided by one or more embodiments of the present disclosure. The method is applied to a terminal device (e.g., the cell phone 102 shown in FIG. 2) that can present a graphical user interface, i.e., the graphical user interface is provided through the terminal device. As shown in FIG. 4, the method includes the following steps S410 to S450.

Step S410, displaying at least one group in the graphical user interface.

A "group" may refer to a group, a camp, a team, etc. For example, in a battle (or a fight) of a game, with respect to a plurality of initial teams of the same camp that are selected for a particular camp to participate in the battle, each initial team may include a number of members (i.e., virtual character) to participate in the battle.

Embodiments of the present disclosure may be applied to a cross-team adjustment process between these initial teams to participate in the battle. For example, if there are a total of 10 teams in the game settings that will participate in the battle, players freely register for different teams, the 10 initial teams will be generated based on the registration status of the players, and the player in charge of the overall camp of the 10 teams (e.g., the captain of the 10 teams) has the right to freely adjust the members of the 10 initial teams that will participate in the battle.

Figure 5:
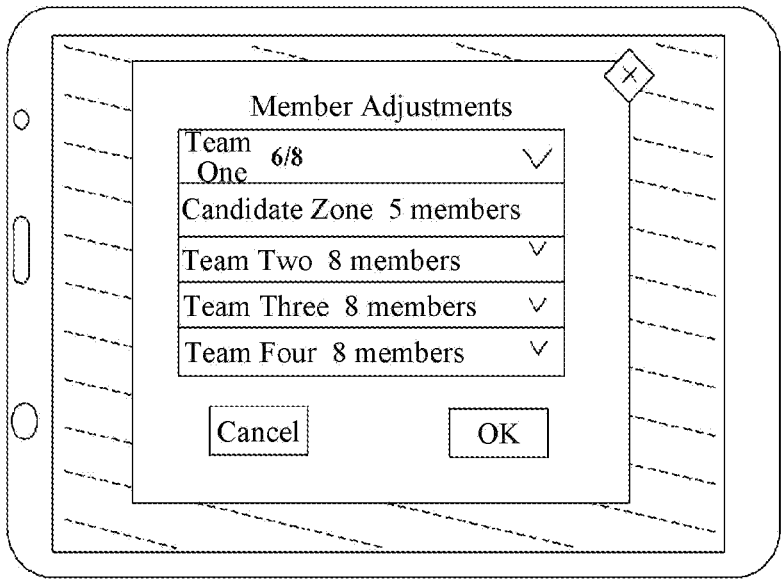
FIG. 5 illustrates a schematic diagram of a touch terminal provided by one or more embodiments of the present disclosure for displaying a graphical user interface.

In an embodiment, the icon corresponding to the group displayed in the graphical user interface may be within a larger area of the graphical user interface, or may be within a smaller area of the graphical user interface. As shown in FIG. 5, the icon corresponding to the group may be a square, rectangle, box, or other shape (e.g., a circle, etc.). The content presented by the graphical user interface can contain all of the corresponding icons of the groups, or may be localized to the hot spot of the content. For example, when the icon corresponding to the group is zoomed in on the graphical user interface, a localized portion of the hot spot of the content is displayed on the graphical user interface of the terminal device. The icon corresponding to the group may be displayed in a center position, a top-left position, or other positions in the graphical user interface, without limitation of this embodiment.

Step S420, displaying, in response to a first selection operation for a first group in the at least one group, an editing interface.

As shown in FIG. 5, the graphical user interface includes at least one group, such as Team One, Team Two, Team Three, and the like. In this step, in response to the first selection operation for Team One, an editing interface of Team One is displayed: in response to the first selection operation for Team Two, an editing interface of Team Two is displayed; in response to the first selection operation for Team Three, an editing interface of Team Three is displayed, and so on.

Figure 6:
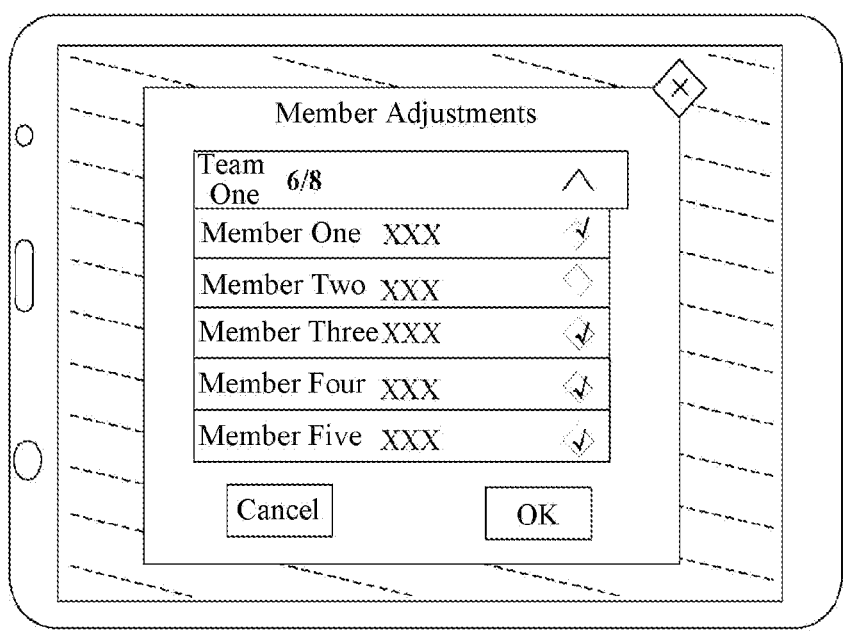
FIG. 6 illustrates a schematic diagram of another touch terminal provided by one or more embodiments of the present disclosure for displaying a graphical user interface.

The editing interface includes at least one first virtual character belonging to the first group. For example, as shown in FIG. 6, the editing interface of Team One includes eight first virtual characters belonging to Team One. In this step, when the editing interface of Team One is displayed, Team One is determined as a team currently to be edited by default, and the editing interface corresponding to the members of the team currently to be edited (hereinafter collectively referred to as the "current team") is expanded for display:

Step S430, moving, in response to a first sub-selection operation for the at least one first virtual character, a first target virtual character selected by the first sub-selection operation from the at least one first virtual character into a target group of the at least one group.

In this step, as shown in FIG. 6, a click on a member of the current team means to remove the member from the current team. In this way, whether or not the member will participate in the battle is determined by the selection operation (i.e., the first sub-selection operation).

The target group, i.e. the group to which the member is added (e.g., via an editing operation as described in the following steps e) and f)) after being removed from the current team, can be a candidate group, which is a set of candidate players that are not in any of the teams to participate in the battle, or it can be interpreted as a candidate pool, e.g., Candidate Zone shown in FIG. 5, where the member removed from the current team will be in the candidate zone.

Step S440, displaying, in response to a second selection operation for a second group in the at least one group, an adjustment interface.

The adjustment interface includes at least one second virtual character belonging to the second group. The second group can be any of the teams to participate in the battle, other than the first group. For example, as shown in FIG. 7, the adjustment interface, corresponding to the members of Team Two to participate in the battle, is expanded and shown by clicking on Team Two (the second group) in the columns of other teams.

Step S450, moving, in response to a second sub-selection operation for the at least one second virtual character, a second target virtual character selected by the second sub-selection operation from the at least one second virtual character into the first group.

Figure 7:
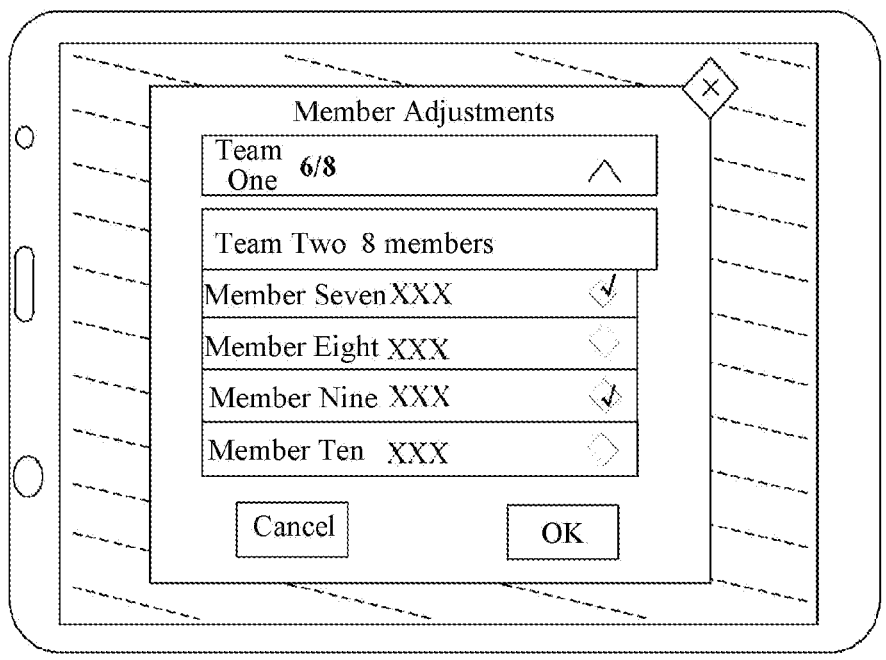
FIG. 7 illustrates a schematic diagram of yet another touch terminal provided by one or more embodiments of the present disclosure for displaying a graphical user interface.

In this step, as shown in FIG. 7, by clicking to select a member of Team Two, the member will be added to the "current team" (the first group) as mentioned above. Thus, the cross-team member adjustment between Team One (the first group) and Team Two (the second group) can be completed.

In the embodiments of the present disclosure, through the form of displaying the interface of multiple teams when members of multiple teams are available for adjustment (e.g., when multiple teams participate in a battle), it is realized that the members to participate in a battle that are in multiple teams and across teams can be conveniently mobilized and adjusted, for example, the members of Team Two are directly adjusted to Team One. In addition, there is no need to provide any additional pop-up windows, and the adjustment of members across teams can be accomplished directly within the same interface, which makes the operation simpler, more convenient, and quicker and improves the player's gaming experience.

The above steps will be described in detail below.

In some embodiments, the at least one group displayed in the graphical user interface may be a group to be edited so as to facilitate processing of the group by the player. For example, the above step S410 may include the following steps.

Step a), generating a plurality of groups based on a preset group assignment rule or a group registration result.

Step b), displaying the at least one group of the plurality of groups in the graphical user interface.

Each group includes at least one virtual character, and the group registration result is determined based on the registration data of the groups that will participate in the battle. For example, if there are a total of 10 teams (groups) to participate in the game, after the players have freely registered for different teams, the teams will be assigned according to the players' free registration, and then 10 initial teams (groups) to participate in the battle will be generated, which will be displayed in the graphical user interface when the 10 initial teams (groups) are edited by the 10 initial teams' captain.

Of course, the system may also generate multiple groups based on the preset group assignment rule. The preset group assignment rule is based on the combat effectiveness data, ranking situation, actual combat data, points data, activity data, and other aspects of the individual members (virtual characters). That is, the system automatically selects a preset number of members based on the game data of the members (virtual characters), such as the points being greater than a certain threshold, the top rankings, the activity level being greater than a certain threshold, and the like. For example, after players register for the battle, the system, in accordance with such preset group assignment rule, refers to the combat effectiveness data, ranking situation, actual combat data, points data, activity data, etc., of each member (virtual character) to make comparisons respectively, in order to carry out a more reasonable assignment of the 10 teams (groups).

Based on steps a) and b) above, the multiple groups may include a group for alternatives, so as to facilitate rational assignment of the groups. Based on this, a plurality of groups includes a candidate group and a plurality of official groups to participate in the battle. The plurality of official groups to participate in the battle includes the first group and the second group. The candidate group includes a candidate virtual character other than the virtual characters corresponding to the official groups to participate in the battle, and the candidate group also includes a virtual character in the target group.

In practice, the candidate group may include a virtual character removed from other official groups that will participate in the battle, i.e., the virtual character that is moved into the target group in step S430 above, or may include a virtual character that is not assigned to the official groups to participate in the battle during the registration process. For example, players register freely for different teams, there are 10 initial teams, and when the quota is full, players who continue to register enter the candidate zone (candidate group), as shown in FIG. 5, which can also be interpreted as a candidate pool.

In some embodiments, after the processing of each group is completed, the permissions of the virtual characters in each processed group may be determined to improve the processing efficiency of the group. Based on this, after the above step S450, the method may further include the following steps.

Step S460, determining a virtual character in the first group and a virtual character in the second group as a virtual character available to participate in a designated battle.

Step S470, determining a virtual character in the target group as a virtual character unavailable to participate in the designated battle.

In practice, when the processing of each group is completed, the permissions of the virtual characters in each processed group can be determined, such as the permissions of the members of each processed team. For example, the virtual characters (members) in the processed first group (e.g., Team One) and the processed second group (e.g., Team Two) can participate in a designated battle, while the virtual characters (members) in the processed target group, i.e., the candidate group (e.g., candidate zone), cannot participate in the designated battle.

In some embodiments, each group and/or each virtual character may be displayed in the graphical user interface in a plurality of different display forms to improve the display efficiency and display flexibility of the graphical user interface. Based on this, the at least one group is displayed in the graphical user interface in a form that includes any one or more of: a form of displaying a list including the at least one group, and a form of displaying an icon corresponding to the at least one group. The virtual character is displayed in the graphical user interface in a form that includes any one or more of: a form of displaying a list including the virtual character, and a form of displaying an icon corresponding to the virtual character.

In practice, when there are members (virtual characters) of multiple teams (groups) available for adjustment, a way the graphical user interface displays multiple teams or members can be in a form of a vertical list showing the teams and the members, as shown in FIGS. 5, 6, and 7.

In some embodiments, there may be different functional options corresponding to each group so that a variety of different functions can be realized for each group. Based on this, any one or more of following controls, corresponding to the at least one group, are displayed in the graphical user interface: a control for viewing, a control for editing, and a control for adjustment.

In practice, each group may be provided with controls that have different functions such as "Edit" control, "View" control, "Adjust" control, etc. For example, the player may choose any team from the ten teams (groups), e.g., Team Four (the fourth group), and click on the "View" control corresponding to Team Four (the fourth group), so that a view interface of the virtual characters corresponding to Team Four (the fourth group) will be displayed.

For example, the at least one group is displayed with a corresponding control for editing in the graphical user interface, and the above step S420 may include the following step.

Step c), displaying, in response to an operation designated for a first control for editing that corresponds to the first group in the at least one group, the editing interface for the first group, and determining the first group as a group currently to be edited.

In practice, each group may be provided with a corresponding "Edit" control to provide editing functions for virtual characters of each group. For example, the player may choose any team from the ten teams (groups), e.g., Team One (the first group), and click on the "Edit" control corresponding to Team One (the first group), so that the editing interface as shown in FIG. 6 will be displayed. In this way, the player will be able to edit the members (virtual characters) of Team One (the first group) more easily:

Based on the above step c), the above group currently to be edited (e.g., the above first group) can be displayed in a fixed way to indicate to the player that the group is currently being edited. Based on this, the group currently to be edited is fixedly displayed in the editing interface or the adjustment interface. For example, as shown in FIGS. 6 and 7, a column of "Team One" is topped and fixed for display in the graphical user interface.

For another example, the at least one group is displayed with a corresponding control for adjustment in the graphical user interface, and the above step S440 may include the following step.

Step d), displaying, in response to an operation designated for a first adjustment control that corresponds to the second group in the at least one group, the adjustment interface for the second group.

In practice, each group may be provided with a corresponding "Adjust" control to provide adjustment functions for virtual characters of each group. For example, the player may choose any team from the ten teams (groups), e.g., Team Two (the second group), and click on the "Adjust" control corresponding to Team Two (the second group), so that the adjustment interface as shown in FIG. 7 will be displayed. In this way, the player will be able to adjust the members (virtual characters) of Team Two (the second group) more easily.

In some embodiments, the graphical user interface may also indicate the number of members in the group that is currently being edited (i.e., the above first group), so that the player can view the number of members in the first group in a timely manner, which facilitates the processing of the virtual characters. Based on this, the graphical user interface further includes at least one of: a current number of the at least one first virtual character or a maximum number of the at least one first virtual character. For example, as shown in FIGS. 5, 6, and 7, the "6/8" in the column of "Team One 6/8" means that the current team has 6 members with a maximum of 8 members.

Of course, the graphical user interface may also indicate the real-time situation of each virtual character, so that the player can view the real-time situation of each virtual character in a timely manner to facilitate the processing of the virtual character. Based on this, the editing interface further includes at least one of: status information or attribute information of the at least one first virtual character. As shown in FIGS. 6 and 7, the status information and/or attribute information corresponding to each member can be displayed behind the name of each member in a member column.

In some embodiments, the editing interface may also indicate whether a virtual character is selected to be included in the first group, so as to improve the accuracy and efficiency of the editing process performed by the player for the virtual character of the first group. For example, the first group is a group currently to be edited: the editing interface further includes a selected mark corresponding to a first virtual character of the at least one first virtual character: and the selected mark is configured to indicate that the first virtual character belongs to the first group: and the above step S430 may further include an editing operation as described in the following steps.

Step e), hiding, in response to the first sub-selection operation for the at least one first virtual character, the selected mark corresponding to the first target virtual character selected by the first sub-selection operation.

Step f), removing, in response to a first confirmation operation for the editing interface, the first target virtual character from the first group and adding the first target virtual character into the target group in the at least one group.

In practice, when entering the editing interface of the first group, the initial status of all the first virtual characters shown in the editing interface is that they belong to the first group by default, and each first virtual character has a selected mark. For example, as shown in FIG. 6, a tick in a box indicates that a member (the first virtual character) belongs to Team One (the first group). When clicking on Member Two (the first target virtual character) in Team One, the check is canceled, and the tick (the selected mark) corresponding to Member Two (the target first virtual character) disappears, which indicates that Member Two (the first target virtual character) is removed from Team One (the first group). That is, whether a member (virtual character) participates in the battle or not is determined by checking a box.

Based on steps e) and f) above, the editing result of the editing operation may be determined by buttons such as an "OK" button, so as to improve the accuracy of the editing result for the editing operation. For example, after the above step f), the method for processing the group in the game may further include the following step.

Step g), hiding the editing interface and displaying the at least one group in the graphical user interface.

In practice, when the player clicks the "OK" button in the editing interface as shown in FIG. 6, the display of virtual characters (members) in the first group (e.g., Team One) can be collapsed, and then the overall status of the virtual characters (members) of other candidate groups (e.g., candidate zones) and other groups (e.g., teams) can be viewed. As shown in FIG. 5, each team is in a column, and in this case, if one of the team columns is clicked, it will be expanded to show the members of the selected team to participate in the battle.

In some embodiments, the end of the process of the editing operation for the first group (Team One) may be realized in various forms to increase the flexibility of the editing operation. For example, after step S420, the method may further include the following step.

Step h), hiding, in response to an exit operation for the first group, the editing interface and displaying the at least one group in the graphical user interface.

In practice, when the player clicks on the column of Team One (the first group) and/or an up-arrow button in the column as shown in FIG. 6, the display of the virtual characters (members) of Team One (the first group) can be collapsed, and then, the overall status of the virtual characters (members) of the other candidate groups (e.g., candidate zones) and the other groups (e.g., teams) can be viewed. As shown in FIG. 5, each team (group) is in a column, and in this case, if one of the team columns is clicked, it will be expanded to show the members of the selected team, such as Team Two (the second group).

In some embodiments, the adjustment interface may also indicate whether a virtual character is selected to be included in the first group, so as to improve the accuracy and efficiency of the adjustment process performed by the player for the virtual character of the second group. For example, the above step S450 may further include an adjustment operation as described in the following steps.

Step i), displaying, in response to the second sub-selection operation for the at least one second virtual character, in the adjustment interface a selected mark corresponding to the second target virtual character selected by the second sub-selection operation, wherein the selected mark is configured to indicate that the second target virtual character belongs to the first group.

Step j), removing, in response to a second confirmation operation for the adjustment interface, the second target virtual character from the second group and adding the second target virtual character into the first group.

In practice, when entering the adjustment interface of the second group, the initial status of all the virtual characters shown in the adjustment interface is that they belong to the second group by default, and each virtual character in the adjustment interface is initially defaulted and does not have a corresponding selected mark, i.e., each virtual character in the adjustment interface does not belong to the first group. For example, a tick in a box indicates that a member (the second target virtual character) belongs to Team One (the first group). As shown in FIG. 7, when clicking on Member Seven and Member Nine (the second target virtual characters) in Team Two (the second group), corresponding check marks are added to indicate that they are selected, i.e., ticks (the selected marks) are displayed for Member Seven and Member Nine (the second target virtual characters) correspondingly, which indicates that Member Seven and Member Nine (the second target virtual characters) will be removed from Team Two (the second group) and added to Team One (the first group), so as to realize the determination of whether or not a member (virtual character) belongs to Team One (the first group) by checking a box.

Based on steps i) and j) above, the adjustment result of the adjustment operation may be determined by buttons such as an "OK" button, so as to improve the accuracy of the adjustment result for the adjustment operation. For example, after the above step j), the method for processing the group in the game may further include the following step.

Step k), hiding the adjustment interface and displaying the at least one group in the graphical user interface.

In practice, as shown in FIG. 7, when the player clicks on Member Seven and Member Nine (the second target virtual characters) in Team Two (the second group), and then clicks on the "OK" button in the adjustment interface, it means that the adjustment process is completed, and the selected Member Seven and Member Nine (the second target virtual characters) can be moved into Team One (the first group). Of course, it is also possible to collapse the display of the members (virtual characters) in Team Two (the second group) at the same time, and the overall status of the members (virtual characters) of the other candidate zones (candidate groups) and the other teams (groups) can be viewed. As shown in FIG. 5, each team is in a column, and in this case, if one of the team columns is clicked, it will be expanded to show the members of the selected team to participate in the battle.

Figure 8:
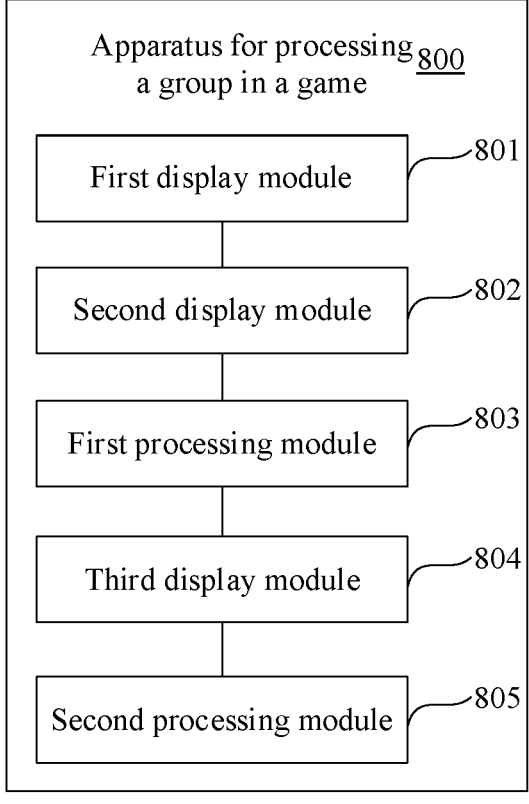
FIG. 8 is a schematic diagram of a structure of an apparatus for processing a group in a game provided by one or more embodiments of the present disclosure.

FIG. 8 provides a schematic diagram of a structure of an apparatus for processing a group in a game. The apparatus can be applied to a terminal device to provide a graphical user interface through the terminal device. As shown in FIG. 8, the apparatus 800 for processing the group in the game includes:

a first display module 801 configured to display at least one group in the graphical user interface;

a second display module 802 configured to display, in response to a first selection operation for a first group in the at least one group, an editing interface, wherein the editing interface includes at least one first virtual character belonging to the first group;

a first processing module 803 configured to move, in response to a first sub-selection operation for the at least one first virtual character, a first target virtual character selected by the first sub-selection operation from the at least one first virtual character into a target group of the at least one group;

a third display module 804 configured to display, in response to a second selection operation for a second group in the at least one group, an adjustment interface, wherein the adjustment interface includes at least one second virtual character belonging to the second group: and a second processing module 805 configured to move, in response to a second sub-selection operation for the at least one second virtual character, a second target virtual character selected by the second sub-selection operation from the at least one second virtual character into the first group.

In some embodiments, the first display module 801 is further configured to:

generate a plurality of groups based on a preset group assignment rule or a group registration result, wherein each group of the plurality of groups includes at least one virtual character; and display the at least one group of the plurality of groups in the graphical user interface.

In some embodiments, the apparatus further includes:

a first determination module configured to determine a virtual character in the first group and a virtual character in the second group as a virtual character available to participate in a designated battle: and a second determination module configured to determine a virtual character in the target group as a virtual character unavailable to participate in the designated battle.

In some embodiments, the at least one group is displayed in the graphical user interface in a form that includes any one or more of:

a form of displaying a list comprising the at least one group, and a form of displaying an icon corresponding to the at least one group: and the virtual character is displayed in the graphical user interface in a form that comprises any one or more of:

a form of displaying a list comprising the virtual character, and a form of displaying an icon corresponding to the virtual character.

In some embodiments, any one or more of following controls, corresponding to the at least one group, are displayed in the graphical user interface:

a control for viewing, a control for editing, and a control for adjustment.

In some embodiments, the at least one group is displayed with a corresponding control for editing in the graphical user interface, and the second display module 802 is further configured to:

display, in response to an operation designated for a first control for editing that corresponds to the first group in the at least one group, the editing interface for the first group, and determine the first group as a group currently to be edited.

In some embodiments, the group currently to be edited is fixedly displayed in the editing interface or the adjustment interface.

In some embodiments, the at least one group is displayed with a corresponding control for adjustment in the graphical user interface, and the third display module 804 is further configured to:

display, in response to an operation designated for a first adjustment control that corresponds to the second group in the at least one group, the adjustment interface for the second group.

In some embodiments, the graphical user interface further includes at least one of: a current number of the at least one first virtual character or a maximum number of the at least one first virtual character.

In some embodiments, the editing interface further includes at least one of: status information or attribute information of the at least one first virtual character.

In some embodiments, the first group is a group currently to be edited: the editing interface further includes a selected mark corresponding to a first virtual character of the at least one first virtual character: and the selected mark is configured to indicate that the first virtual character belongs to the first group. The first processing module 803 is further configured to:

hide, in response to the first sub-selection operation for the at least one first virtual character, the selected mark corresponding to the first target virtual character selected by the first sub-selection operation; and remove, in response to a first confirmation operation for the editing interface, the first target virtual character from the first group and add the first target virtual character into the target group in the at least one group.

In some embodiments, the first processing module 803 is further configured to:

hide the editing interface and display the at least one group in the graphical user interface.

In some embodiments, the apparatus further includes:

a fourth display module configured to hide, in response to an exit operation for the first group, the editing interface and display the at least one group in the graphical user interface, after displaying the editing interface in response to the first selection operation for the first group in the at least one group.

In some embodiments, the second processing module 805 is further configured to:

display, in response to the second sub-selection operation for the at least one second virtual character, in the adjustment interface a selected mark corresponding to the second target virtual character selected by the second sub-selection operation, wherein the selected mark is configured to indicate that the second target virtual character belongs to the first group: and remove, in response to a second confirmation operation for the adjustment interface, the second target virtual character from the second group and add the target second virtual character into the first group.

In some embodiments, the second processing module 805 is further configured to:

hide the adjustment interface and display the at least one group in the graphical user interface.

The apparatus for processing the group in the game provided in the embodiments of the present disclosure has the same technical features as the method for processing the group in the game provided in the above embodiments, and therefore can solve the same technical problems and achieve the same technical effects.

Corresponding to the above method for processing the group in the game, a computer-readable storage medium is further provided by embodiments of the present disclosure. The computer-readable storage medium stores computer-runnable instructions that, when invoked and run by a processor, cause the processor to perform the steps of the method for processing the group in the game as described above.

The apparatus for processing the group in the game provided in the embodiments of the present disclosure may be a specific hardware on the device or software or firmware installed on the device. The apparatus provided in the embodiments of the present disclosure has the same realization principle and technical effect as the aforementioned method embodiments, and for the purpose of brief description, the corresponding contents of the aforementioned method embodiments may be referred to in the part of the device embodiments that is not mentioned in the present disclosure. Those skilled in the art can clearly understand that for the convenience and simplicity of description, the specific working processes of the systems, devices and units described above can be referred to the corresponding processes in the above method embodiments, and will not be repeated herein.

It should be understood that in the embodiments provided in the present disclosure, the disclosed apparatus or devices and methods can be realized in other ways. The above embodiments of the devices are merely illustrative, for example, the division of the units described herein is only a logical functional division, and there may be other ways of dividing the units for actual implementation, for another example, multiple units or components may be combined or integrated into another system, or some features may be ignored or not implemented. In addition, the coupling or direct coupling or communication connection between the devices or units shown or discussed may be through some communication interface, and indirect coupling or communication connection between the devices or units may be electrical, mechanical or other forms.

For example, the flowcharts and block diagrams in the accompanying drawings show the architecture, functionality; and operation of possible implementations of devices, methods, and computer program products according to various embodiments of the present disclosure. In this regard, each box in the flowcharts or block diagrams may represent a module, program segment, or portion of code, the module, program segment, or portion of code including one or more executable instructions that are set to implement a specified logical function. It should also be noted that in some implementations as substitutions, the functions labeled in the boxes may also occur in a different order than those labeled in the accompanying drawings. For example, two consecutive boxes may actually be executed substantially in parallel, or may sometimes be executed in reverse order, depending on the function involved. It should also be noted that each box in the block diagram and/or flowchart, as well as combinations of boxes in the block diagram and/or flowchart, may be implemented with a specialized hardware-based system that performs the specified function or action, or may be implemented with a combination of specialized hardware and computer instructions.

The units illustrated as separated components may or may not be physically separated, and components displayed as units may or may not be physical units, i.e., they may be located in one place, or they may be distributed to a plurality of network units. Some or all of these units may be selected to fulfill the purpose of the scheme of the embodiments according to actual requirements.

In addition, the functional units in the embodiments provided in the present disclosure may be integrated into a single processing unit, may be separated physically, or two or more units thereof may be integrated in a single unit.

The functionality; when implemented as a software functional unit and sold or used as a stand-alone product, may be stored in a computer-readable storage medium. Based on this, the technical solutions of the present disclosure may be embodied essentially or in part as a contribution to the prior art or in part in the form of a software product that is stored on a storage medium and includes instructions for causing a computer device (which may be a personal computer, server, or network device, etc.) to perform all or some of the steps of the method for processing the group in the game as described in various embodiments of the present disclosure. The aforementioned storage medium include: USB flash drive, portable hard disk, Read-Only Memory (ROM), Random Access Memory (RAM), magnetic disk or CD-ROM, and other kinds of media that can store program code.

It should be noted that similar symbols and letters indicate similar items in the accompanying drawings, so that once an item is defined in a drawing, no further definition or explanation is required in subsequent drawings. Furthermore, the terms "first", "second", "third", etc., are used only for the purpose of description by distinction and are not to be understood as indicating or implying relative importance.

Finally, it should be noted that the above mentioned embodiments are only specific implementations of the present disclosure to illustrate the technical solutions of the present disclosure, not a limitation thereof, and the scope of protection of the present disclosure is not limited thereto. Although the present disclosure has been described in detail with reference to the above mentioned embodiments, a person of ordinary skill in the art should understand that, any person of skill familiar with the technical field may still make modifications or easily conceivable changes to the technical solutions described in the above mentioned embodiments or make equivalent substitutions of some of the technical features therein, within the scope of the technology disclosed in this disclosure, and such modifications, changes or substitutions do not make the essence of the corresponding technical solutions out of the scope of the technical solutions of the embodiments of this disclosure. These modifications, changes or substitutions shall be covered by the scope of protection of the present disclosure. Therefore, the scope of protection of the present disclosure shall be subject to the scope of protection of the claims.

What is claimed is:

1. A method for processing a group in a game, comprising:
   providing a graphical user interface via a terminal device, and displaying at least one group in the graphical user interface;
   displaying, in response to a first selection operation for a first group in the at least one group, an editing interface, wherein the editing interface comprises at least one first virtual character belonging to the first group;

moving, in response to a first sub-selection operation for the at least one first virtual character, a first target virtual character selected by the first sub-selection operation from the at least one first virtual character into a target group of the at least one group;
   displaying, in response to a second selection operation for a second group in the at least one group, an adjustment interface, wherein the adjustment interface comprises at least one second virtual character belonging to the second group; and
   moving, in response to a second sub-selection operation for the at least one second virtual character, a second target virtual character selected by the second sub-selection operation from the at least one second virtual character into the first group.

2. The method of claim 1, wherein displaying the at least one group in the graphical user interface, comprises:
   generating a plurality of groups based on a preset group assignment rule or a group registration result, wherein each group of the plurality of groups comprises at least one virtual character; and
   displaying the at least one group of the plurality of groups in the graphical user interface.

3. The method of claim 1, further comprising:
   determining a virtual character in the first group and a virtual character in the second group as a virtual character available to participate in a designated battle; and
   determining a virtual character in the target group as a virtual character unavailable to participate in the designated battle.

4. The method of claim 1, wherein
   the at least one group is displayed in the graphical user interface in a form that comprises any one or more of: a form of displaying a list comprising the at least one group, and a form of displaying an icon corresponding to the at least one group; and
   the virtual character is displayed in the graphical user interface in a form that comprises any one or more of: a form of displaying a list comprising the virtual character, and a form of displaying an icon corresponding to the virtual character.

5. The method of claim 1, wherein any one or more of following controls, corresponding to the at least one group, are displayed in the graphical user interface:
   a control for viewing, a control for editing, and a control for adjustment.

6. The method of claim 5, wherein the at least one group is displayed with a corresponding control for editing in the graphical user interface, and
   displaying the editing interface in response to the first selection operation for the first group in the at least one group, further comprising:
   displaying, in response to an operation designated for a first control for editing that corresponds to the first group in the at least one group, the editing interface for the first group, and determining the first group as a group currently to be edited.

7. The method of claim 6, wherein the group currently to be edited is fixedly displayed in the editing interface or the adjustment interface.

8. The method of claim 5, wherein the at least one group is displayed with a corresponding control for adjustment in the graphical user interface, and
   displaying the adjustment interface in response to the second selection operation for the second group in the at least one group, further comprising:

displaying, in response to an operation designated for a first adjustment control that corresponds to the second group in the at least one group, the adjustment interface for the second group.

9. The method of claim 1, wherein the graphical user interface further comprises at least one of: a current number of the at least one first virtual character or a maximum number of the at least one first virtual character.

10. The method of claim 1, wherein the editing interface further comprises at least one of: status information or attribute information of the at least one first virtual character.

11. The method of claim 1, wherein the first group is a group currently to be edited; the editing interface further comprises a selected mark corresponding to a first virtual character of the at least one first virtual character; and the selected mark is configured to indicate that the first virtual character belongs to the first group;

move the first target virtual character selected by the first sub-selection operation into the target group of the at least one group in response to the first sub-selection operation for the at least one first virtual character, further comprising:

hiding, in response to the first sub-selection operation for the at least one first virtual character, the selected mark corresponding to the first target virtual character selected by the first sub-selection operation; and removing, in response to a first confirmation operation for the editing interface, the first target virtual character from the first group and adding the first target virtual character into the target group in the at least one group.

12. The method of claim 11, further comprising:

hiding the editing interface and displaying the at least one group in the graphical user interface.

13. The method of claim 1, further comprising:

hiding, in response to an exit operation for the first group, the editing interface and displaying the at least one group in the graphical user interface.

14. The method of claim 1, wherein moving, in response to the second sub-selection operation for the at least one second virtual character, the second target virtual character selected by the second sub-selection operation into the first group, further comprises:

displaying, in response to the second sub-selection operation for the at least one second virtual character, in the adjustment interface a selected mark corresponding to the second target virtual character selected by the second sub-selection operation, wherein the selected mark is configured to indicate that the second target virtual character belongs to the first group; and removing, in response to a second confirmation operation for the adjustment interface, the second target second virtual character from the second group and adding the second target virtual character into the first group.

15. The method of claim 14, further comprising:

hiding the adjustment interface and displaying the at least one group in the graphical user interface.

16. An electronic terminal, comprising a memory and a processor, wherein the memory has a computer program stored therein that is runnable on the processor, and the processor, when executing the computer program, implements following acts:

providing a graphical user interface and displaying at least one group in the graphical user interface;

displaying, in response to a first selection operation for a first group in the at least one group, an editing interface, wherein the editing interface comprises at least one first virtual character belonging to the first group;

moving, in response to a first sub-selection operation for the at least one first virtual character, a first target virtual character selected by the first sub-selection operation from the at least one first virtual character into a target group of the at least one group;

displaying, in response to a second selection operation for a second group in the at least one group, an adjustment interface, wherein the adjustment interface comprises at least one second virtual character belonging to the second group; and moving, in response to a second sub-selection operation for the at least one second virtual character, a second target virtual character selected by the second sub-selection operation from the at least one second virtual character into the first group.

17. The electronic terminal of claim 16, wherein any one or more of following controls, corresponding to the at least one group, are displayed in the graphical user interface: a control for viewing, a control for editing, and a control for adjustment;

when the at least one group is displayed with a corresponding control for editing in the graphical user interface, displaying the editing interface in response to the first selection operation for the first group in the at least one group, further comprises: displaying, in response to an operation designated for a first control for editing that corresponds to the first group in the at least one group, the editing interface for the first group, and determining the first group as a group currently to be edited;

when the at least one group is displayed with a corresponding control for adjustment in the graphical user interface, displaying the adjustment interface in response to the second selection operation for the second group in the at least one group, further comprises: displaying, in response to an operation designated for a first adjustment control that corresponds to the second group in the at least one group, the adjustment interface for the second group.

18. The electronic terminal of claim 16, wherein the first group is a group currently to be edited; the editing interface further comprises a selected mark corresponding to a first virtual character of the at least one first virtual character; and the selected mark is configured to indicate that the first virtual character belongs to the first group; and moving the first target virtual character selected by the first sub-selection operation into the target group of the at least one group in response to the first sub-selection operation for the at least one first virtual character, further comprises:

hiding, in response to the first sub-selection operation for the at least one first virtual character, the selected mark corresponding to the first target virtual character selected by the first sub-selection operation; and removing, in response to a first confirmation operation for the editing interface, the first target virtual character from the first group and adding the first target virtual character into the target group in the at least one group.

19. The electronic terminal of claim 16, wherein moving, in response to the second sub-selection operation for the at least one second virtual character, the second target virtual character selected by the second sub-selection operation into the first group, further comprises:

displaying, in response to the second sub-selection operation for the at least one second virtual character, in the adjustment interface a selected mark corresponding to the second target virtual character selected by the second sub-selection operation, wherein the selected mark is configured to indicate that the second target virtual character belongs to the first group; and removing, in response to a second confirmation operation for the adjustment interface, the second target virtual character from the second group and adding the second target virtual character into the first group.

20. A non-transitory computer-readable storage medium, having computer-runnable instructions stored thereon, wherein the computer-runnable instructions, when invoked and run by a processor, cause the processor to;

provide a graphical user interface and display at least one group in the graphical user interface;

display, in response to a first selection operation for a first group in the at least one group, an editing interface, wherein the editing interface comprises at least one first virtual character belonging to the first group;

move, in response to a first sub-selection operation for the at least one first virtual character, a first target virtual character selected by the first sub-selection operation from the at least one first virtual character into a target group of the at least one group;

display, in response to a second selection operation for a second group in the at least one group, an adjustment interface, wherein the adjustment interface comprises at least one second virtual character belonging to the second group; and move, in response to a second sub-selection operation for the at least one second virtual character, a second target virtual character selected by the second sub-selection operation from the at least one second virtual character into the first group.

* * * * *